July 4, 1961     I. D. DE BELLA     2,990,899
BED PATIENT WEIGHING MEANS

Filed Nov. 24, 1958     2 Sheets-Sheet 1

INVENTOR
Isabelle D. DeBella
BY John B. Dickman III
agent

July 4, 1961
I. D. DE BELLA
2,990,899
BED PATIENT WEIGHING MEANS
Filed Nov. 24, 1958
2 Sheets-Sheet 2
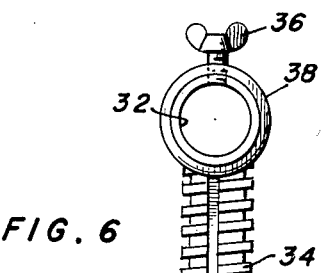
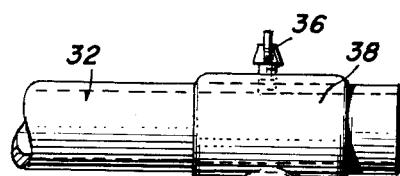
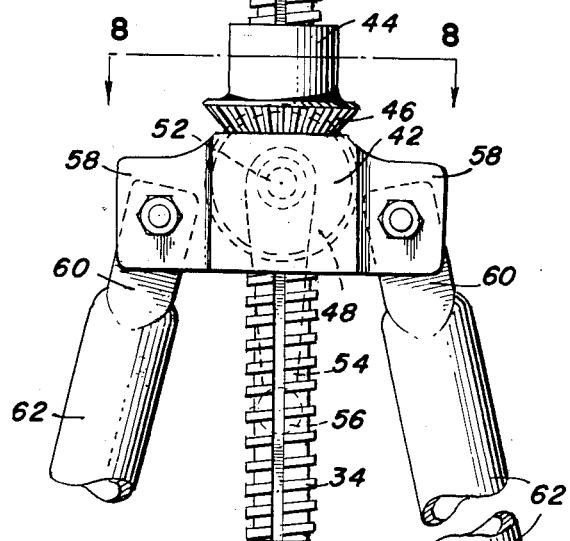
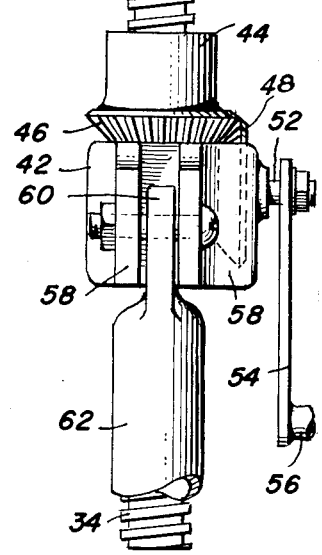
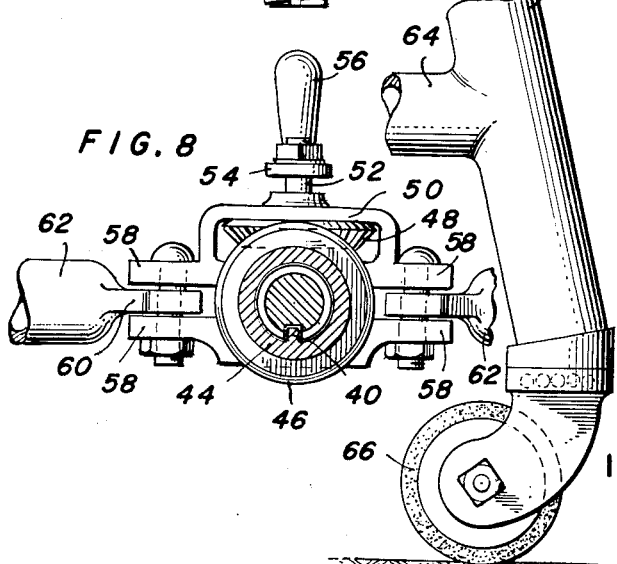
Isabelle D. DeBella INVENTOR
BY John B. Dickman III
Agent

United States Patent Office 2,990,899
Patented July 4, 1961

2,990,899
BED PATIENT WEIGHING MEANS
Isabelle D. De Bella, 4105 Wisconsin Ave., NW.,
Washington, D.C.
Filed Nov. 24, 1958, Ser. No. 775,780
2 Claims. (Cl. 177—139)

This invention relates to bed patient weighing means for application to bed-ridden persons, without requiring them to rise to a sitting or standing position.

In the treatment of many hospitalized patients it is necessary to closely watch their change in weight and modify the treatments accordingly to make them most effective in bringing about a return to health. It is often difficult or impossible for the patient to be moved to any ordinary weighing scales without harming his condition or setting back his recovery, especially when a frequent and close check up on his weight is required.

The main object of the present invention is to provide a suitable means for weighing a patient while he is lying in bed.

A further object is to provide a portable support frame over the bed for lifting the patient vertically together with a stretcher-like top portion of the bed while he retains his prone position therein, the lifting means having a weight scale incorporated therein for weighing the lifted patient, taking into account the weight of said stretcher-like portion.

A further object is to provide a sling-type suspension for attachment to the stretcher-like top portion of the bed and for raising said portion with the patient lying on it, free of he rest of the bed, before reading the weight scale.

A further object is to use a suitable strong sheet of flexible material on the bed under the patient, said sheet being provided with stretcher poles at the sides for attachment to sling-type suspension means fixed to a weighing scale, which is hung on a raisable part of a support frame positioned over the bed.

A further object is to make the above support frame portable, so as to adapt it for use with any one of a number of bed patients, as in a hospital.

Other and more specific objects will become apparent in the following detailed description of one form of the present invention as illustrated in the accompanying drawings, wherein:

FIG. 1 is a side elevation of a portable weighing device positioned over a bed for weighing a bed-ridden patient, FIG. 2 is an end elevation thereof, with the suspension slings normally unattached to the weighing device, FIG. 3 is a similar view, showing the slings attached to the scale hook and the scale suspension means raised to lift the patient free of the bed, FIG. 4 is a similar view of the portable support, without the weighing scales, showing how it may be used for transporting a bed-ridden patient to a weighing table or platform.

FIG. 6 is an enlarged detail of the suspension raising means at one of the side frames of the support, FIG. 7 is an end view thereof, and FIG. 8 is a section view taken on the line 8—8 of FIG. 6.

Figure 1:
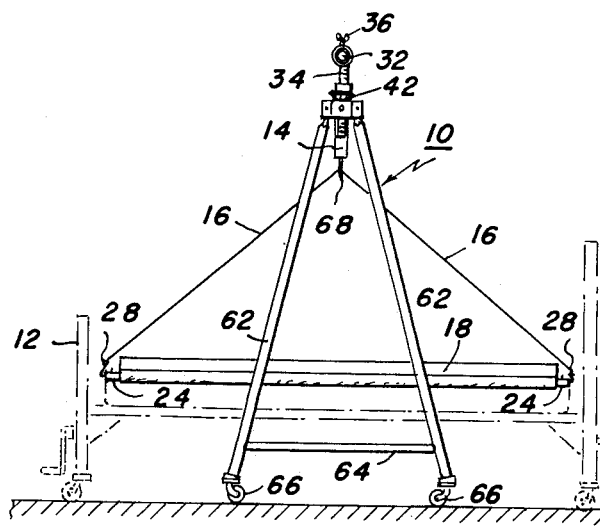

The portable weighing device comprises a simple frame 10 forming a vertically adjustable arch over a bed 12 and having a weighing scale 14 suspended from the middle thereof, and slings 16 extending from the corners of a stretcher-like top portion 18 of the bed, for attachment to the scale 14, so that said portion may be raised off the bed proper by lifting the adjustable arch to permit weighing of said portion and any patient that might be lying in it without disturbing his prone position. Thus a bed-ridden patient may be weighed at any time whether he be awake or asleep, and his exact gain or loss in weight closely watched, without requiring him to rise or be moved from his prone position. The patient's exact weight may obviously also be determined by taking into account the dead weight of said portion and slings.

Figure 2:
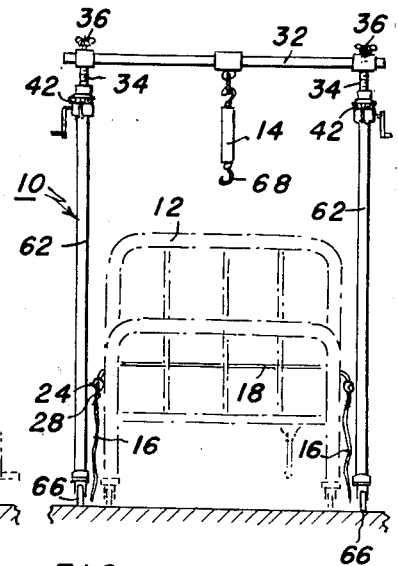
Figure 3:
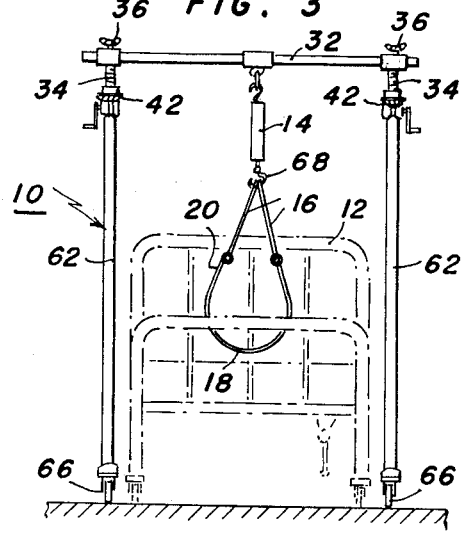

The stretcher-like portion 18 comprises a sheet 20 of flexible material having looped side edges 22 for insertion of stretcher poles 24, which may be provided with diametric bores 26 at their extending ends, to which the sling hooks 28 are attached by passing the hooks through these bores. The flexible sheet 20 may be placed over the mattress under the bed sheet in making up the bed, with the poles and slings hanging loosely at the sides of the bed, as shown in FIG. 2. Obviously, the slings could be attached to the corners of the bed spring frame, which could be lifted with the springs, mattress and patient, if the device were made strong enough to accommodate the extra weight. The springs and mattress would then be included in the stretcher-like portion of the bed.

Figure 4:
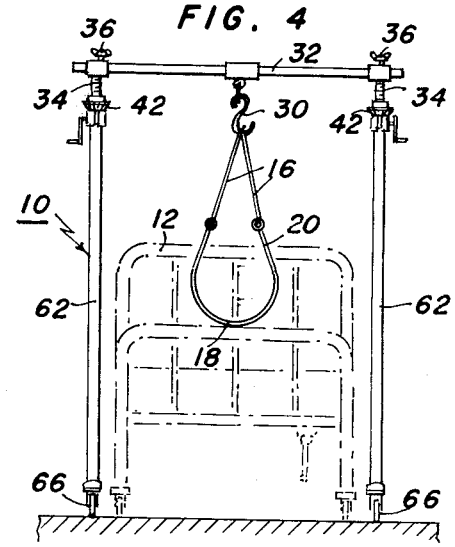
Figure 5:
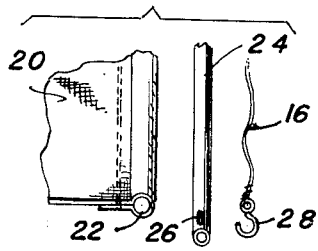
FIG. 5 shows enlarged details of attachment means for the suspension sling.

This weighing device may also be used as a means for moving a bed-ridden patient from one bed to another or to an operating table, weighing platform, etc. For this purpose, the scale 14 may be replaced by a simple suspension hook 30, as shown in FIG. 4.

The arch portion of the frame, shown for purposes of illustration, is a horizontal pipe 32 having downwardly extending vertical jack-screws 34 fixed at its ends by means of thumb screws 36 passed through bores in the top of closely fitting sleeves 38 and screwed into the pipe 32. Sleeves 38 are integral with the jack-screws 34. Each jack-screw is axially splined as shown at 40, to slide vertically without turning in the yoke member 42, the top of which provides a thrust bearing for the lift gear 44 which has an internal thread matching the square jack-screw thread.

Lift gear 44 has a bevel gear 46 operated by level gear 48 which is rotatably mounted in a bearing 50 in the yoke member 42, its shaft 52 extending outwardly to receive an operating crank arm 54 which is provided with a handle 56 for manual operating of the jacks to raise or lower the pipe 32. The yoke members 42 have oppositely extending ears 58 for attachment to the upper ends 60 of a pair of angularly extending leg members 62 forming the arch support at each side of the frame. The leg members 62 in each support are rigidly connected by a horizontal member 64, and are provided at their lower ends with swivelled rollers 66 for rolling the entire frame into straddling position over any bed for raising or lowering a patient therefrom or thereinto respectively.

The weighing scale 14, although shown as a common spring scale, may be of any suitable form, either of the spring or balance weight and lever type, and is suspended from the middle of the arch. It is provided with a hanger hook 68 for receiving the upper ends of the slings 16 extending from the corners of the stretcher-like portion of the bed. The slings 16 attached to the corners on each side of the bed may be joined together into one continuous sling, the middle of which is simply hung over the hook 68, as shown in FIG. 1.

It is thought that the construction and operation of the invention will now be clearly understood without a more detailed description thereof. It is, however, desired to point out that the present embodiment of the invention which I have described in detail has been given merely by way of example and that the same attains all the features of advantage enumerated as desirable in the statement of the invention and the above description, and that numerous changes may be made in the details of construction, in the proportions, in the materials, and in the combination and arrangement of parts as will be hereinafter claimed.

What is claimed is:

1. A portable stretcher suspension device for weighing and transporting a bed patient, comprising a pair of upright end frames, each end frame having a vertical sleeve in its upper end and a post slidably mounted therein, means on each of said end frames for manually adjusting the corresponding post in its sleeve, a horizontally extending bar fixed to the upper ends of said posts, hanger means fixed to said bar between said posts, and sling means hung on said hanger means and having hooks for attachment to the four corners of a stretcher, each end frame having a base extending to both sides of said bar, rollers provided under said base for easy mobility of said device into straddling position over a bed patient, and a weighing scale incorporated in said hanger means, whereby a nurse may single-handedly weigh and transport a bed patient in the stretcher without disturbing or waking the patient.

2. A portable suspension device as defined in claim 1, said manually adjustable means on each end comprising an external square thread on said post, said post being keyed against turning in its sleeve, a bevel gear having an internal thread engaging said external thread above said sleeve, the hub of said gear bearing on the upper end of said sleeve, and a matching bevel gear mounted on the outside of said sleeve and having an operating crank for manually raising and lowering of the corresponding post in its sleeve.

References Cited in the file of this patent

UNITED STATES PATENTS

| | | |
|---|---|---|
| 689,642 | Fannon | Dec. 24, 1901 |
| 901,370 | Poppert | Oct. 20, 1908 |
| 1,465,057 | Riker | Aug. 14, 1923 |
| 1,919,823 | Bowling | July 25, 1933 |
| 1,962,042 | Stevenson | June 5, 1934 |
| 1,968,477 | Cole | July 31, 1934 |
| 2,125,546 | Corr | Aug. 2, 1938 |
| 2,429,865 | Bresch | Oct. 28, 1947 |